US012706854B2

(12) United States Patent
Saber et al.

(10) Patent No.: US 12,706,854 B2
(45) Date of Patent: Aug. 11, 2026

(54) SYSTEM AND METHOD FOR A USER EQUIPMENT TO PROCESS OVERLAPPING PHYSICAL DOWNLINK SHARED CHANNELS

(71) Applicant: Samsung Electronics Co., Ltd., Gyeonggi-do (KR)

(72) Inventors: Hamid Saber, San Diego, CA (US); Jung Hyun Bae, San Diego, CA (US)

(73) Assignee: Samsung Electronics Co., Ltd (KR)

(*) Notice: Subject to any disclaimer, the term of this patent is extended or adjusted under 35 U.S.C. 154(b) by 259 days.

(21) Appl. No.: 17/003,121

(22) Filed: Aug. 26, 2020

(65) Prior Publication Data

US 2021/0105217 A1 Apr. 8, 2021

Related U.S. Application Data

(60) Provisional application No. 62/910,376, filed on Oct. 3, 2019.

(51) Int. Cl.
*H04L 47/283* (2022.01)
*H04L 1/1812* (2023.01)
*H04W 72/23* (2023.01)
*H04W 72/51* (2023.01)

(52) U.S. Cl.
CPC .......... *H04L 47/283* (2013.01); *H04L 1/1812* (2013.01); *H04W 72/23* (2023.01); *H04W 72/51* (2023.01)

(58) Field of Classification Search
CPC ... H04L 47/283; H04L 1/1812; H04L 1/1854; H04L 1/0018; H04W 72/048; H04W 72/1289; H04W 72/1273
See application file for complete search history.

(56) References Cited

U.S. PATENT DOCUMENTS 10,548,096 B2 * 1/2020 Papasakellariou .... H04W 52/08
10,554,470 B2 2/2020 John Wilson et al.
10,742,234 B2 * 8/2020 Sun .................. H03M 13/6306
10,873,936 B2 * 12/2020 Huang .................. H04L 5/0098
(Continued)

FOREIGN PATENT DOCUMENTS

CN 112398623 B * 3/2022 ............ H04W 72/20
WO WO-2020199174 A1 * 10/2020
WO WO-2021028873 A1 * 2/2021 .......... H04W 72/569

OTHER PUBLICATIONS

U.S. Appl. No. 62/847,263 Provisional, 2019,Specification (Year: 2019).*

(Continued)

*Primary Examiner* — Joseph E Avellino
*Assistant Examiner* — Anindita Sen
(74) *Attorney, Agent, or Firm* — The Farrell Law Firm, P.C.

(57) ABSTRACT

A method, user equipment (UE), and terminal are disclosed, the method includes receiving a first physical downlink shared channel (PDSCH), receiving a second PDSCH that overlaps in time with the first PDSCH, determining a delay in processing time for a hybrid automatic repeat request (HARD)-acknowledgement (ACK) corresponding to the second PDSCH based on the overlapping time between the first PDSCH and the second PDSCH, and transmitting the HARQ-ACK corresponding to the second PDSCH.

20 Claims, 9 Drawing Sheets

(56) References Cited

U.S. PATENT DOCUMENTS

| | | | | |
|---|---|---|---|---|
| 10,911,286 | B2 * | 2/2021 | Chen | H04L 5/001 |
| 10,945,281 | B2 * | 3/2021 | Nammi | H04W 72/23 |
| 10,973,029 | B2 * | 4/2021 | Shi | H04W 72/23 |
| 10,999,761 | B2 * | 5/2021 | He | H04L 1/1816 |
| 11,206,108 | B2 * | 12/2021 | Wang | H04W 72/20 |
| 2018/0206258 | A1 | 7/2018 | Hosseini et al. | |
| 2020/0053748 | A1 | 2/2020 | Hosseini et al. | |
| 2020/0053765 | A1 | 2/2020 | Chien et al. | |
| 2020/0077405 | A1 | 3/2020 | Zhang | |
| 2020/0100248 | A1 | 3/2020 | Kim et al. | |
| 2020/0154466 | A1 * | 5/2020 | John Wilson | H04L 5/0055 |
| 2020/0170034 | A1 * | 5/2020 | Kim | H04W 72/1273 |
| 2020/0367241 | A1 * | 11/2020 | Hosseini | H04W 72/0453 |
| 2021/0184804 | A1 * | 6/2021 | Park | H04L 1/1822 |
| 2021/0243751 | A1 * | 8/2021 | Saber | H04W 72/21 |
| 2022/0174523 | A1 * | 6/2022 | Liu | H04L 1/1854 |

OTHER PUBLICATIONS

U.S. Appl. No. 62/847,263 Provisional, 2019,Claims (Year: 2019).*

U.S. Appl. No. 62/847,263 Provisional, 2019,Drawing (Year: 2019).*

U.S. Appl. No. 62/886,324, Provisional, 2019, Specification (Year: 2019).*

Physical Layer procedures for data (Year: 2020).*

Understanding 5G (Year: 2022).*

U.S. Appl. No. 62/886,324, Provisional, 2019,Claims (Year: 2019).*

U.S. Appl. No. 62/886,324, Provisional, 2019, Drawing (Year: 2019).*

Ts_138213v150300p.pdf (Year: 2018).*

Huawei, HiSilicon, "Enhancements to Scheduling/HARQ", R1-1908054, 3GPP TSG RAN WG1 Meeting #98, Aug. 26-30, 2019, 13 pages.

Spreadtrum Communications, "Discussion on UCI Enhancements for URLLC", R1-1910028, 3GPP TSG RAN WG1 #98bis, Oct. 14-20, 2019, 8 pages.

Qualcomm Incorporated, "UCI Enhancements for e-URLLC", R1-1909575, 3GPP TSG-RAN WG1 #98, Aug. 26-30, 2019, 22 pages.

Korean Office Action dated Mar. 3, 2026 issued in counterpart application No. 10-2020-0119146, 5 pages.

* cited by examiner

SYSTEM AND METHOD FOR A USER EQUIPMENT TO PROCESS OVERLAPPING PHYSICAL DOWNLINK SHARED CHANNELS

PRIORITY

This application is based on and claims priority under 35 U.S.C. § 119(e) to U.S. Provisional patent application filed on Oct. 3, 2019 in the United States Patent and Trademark Office and assigned Ser. No. 62/910,376, the entire contents of which are incorporated herein by reference.

FIELD

The present disclosure is generally related to wireless communication systems. In particular, the present disclosure is related to a system and method for providing delays when channels overlap.

BACKGROUND

There are some features related to scheduling and hybrid automatic repeat request (HARQ) acknowledgment (ACK) reporting in Rel-15. Among these features are the so-called in-order HARQ-ACK, in-order physical uplink shared channel (PUSCH) and in-order physical downlink shared channel (PDSCH).

For overlapping PDSCHs, in Rel-15, two unicast PDSCHs (i.e., a PDSCH with assigned HARQ process ID's) cannot overlap in time. The Rel-15 in-order operations are not well optimized to ensure the latency requirement of ultra-reliable low latency communication (URLLC). This is because once an enhanced mobile broadband (eMBB) traffic has been scheduled, upon later arrival of a higher priority URLLC traffic, the terminal (gNB) cannot schedule the URLLC traffic until after the end of the eMBB traffic. Similarly, with in-order HARQ, if the URLLC PDSCH arrives later than eMBB PDSCH, its corresponding HARQ-ACK bits cannot be transmitted earlier than those of eMBB PDSCH to reduce the end-to-end latency.

SUMMARY

According to one embodiment, a method includes receiving a first PDSCH, receiving a second PDSCH that overlaps in time with the first PDSCH, determining a delay in processing time for a HARQ-ACK corresponding to the second PDSCH based on the overlapping time between the first PDSCH and the second PDSCH, and transmitting the HARQ-ACK corresponding to the second PDSCH.

According to one embodiment, a user equipment (UE) includes a transceiver, and a processor configured to receive, from a terminal, a first PDSCH, receive, from the terminal, a second PDSCH that overlaps in time with the first PDSCH, determine a delay in processing time for a HARQ-ACK corresponding to the second PDSCH based on the overlapping time between the first PDSCH and the second PDSCH, and transmit, to the terminal, the HARQ-ACK corresponding to the second PDSCH.

According to one embodiment, a terminal includes a transceiver, and a controller configured to transmit, to a UE, a first PDSCH, transmit, to the UE, a second PDSCH that overlaps in time with the first PDSCH, receive, from the UE, a HARQ-ACK corresponding to the second PDSCH that is delayed by the UE based on the overlapping time between the first PDSCH and the second PDSCH.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
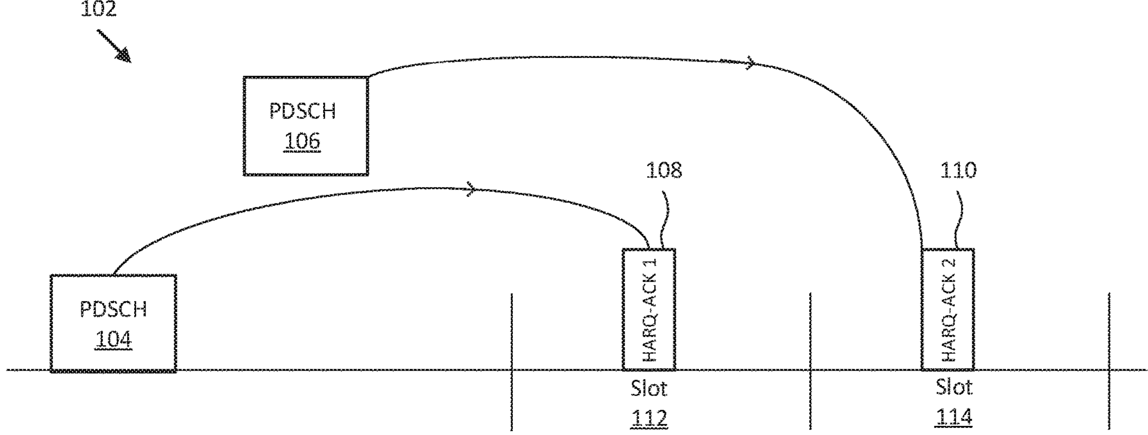
FIG. 1 illustrates a diagram of an in-order HARQ-ACK operation, according to an embodiment.
Figure 1:
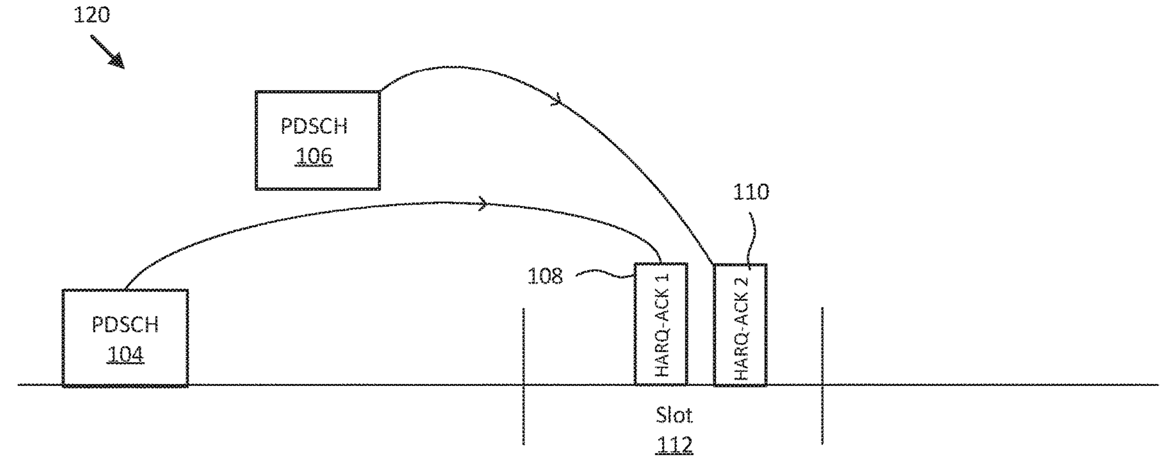

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "2nd," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wired), wirelessly, or via a third element.

As used herein, the term "module" may include a unit implemented in hardware, software, or firmware, and may interchangeably be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

FIG. 1 illustrates a diagram of an in-order HARQ-ACK operation, according to an embodiment. For an in-order HARQ-ACK operation, in rel-15, the PUSCH transmission is referred to be in-order. TS 38.213 reads "in a given scheduled cell, the UE is not expected to receive a first PDSCH in slot i, with the corresponding HARQ-ACK assigned to be transmitted in slot j, and a second PDSCH starting later than the first PDSCH with its corresponding HARQ-ACK assigned to be transmitted in a slot before slot j." This means that a HARQ-ACK of a later PDSCH cannot be transmitted before that of an earlier PDSCH. For example, in the HARQ-ACK operation 102, the HARQ-ACK 108 for a first PDSCH 104 occurs in a first slot 112 and the HARQ-ACK 110 for a second PDSCH 106 occurs in a second slot 114. The HARQ-ACKs are in order corresponding to the PDSCH order of PDSCHs 104 and 106. Similarly, as shown in HARQ-ACK operation 120, the HARQ-ACK 110 for the second PDSCH 106 occurs in the same slot 112 as the HARQ-ACK 106, but the operation is still in order.

Figure 2:
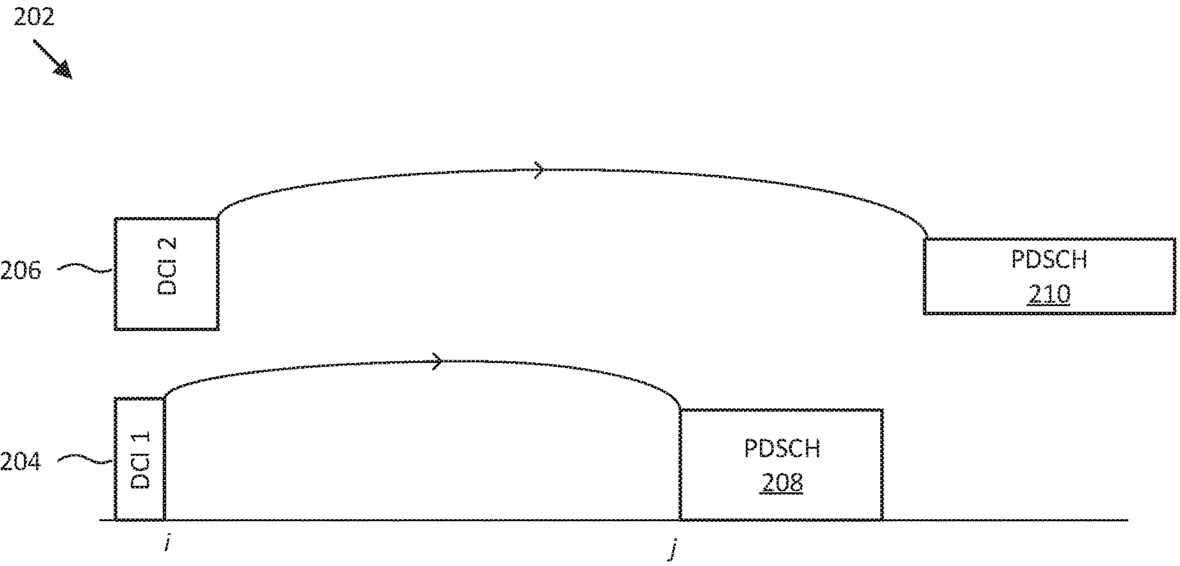
FIG. 2 illustrates a diagram of an in-order PDSCH operation, according to an embodiment.

FIG. 2 illustrates a diagram of an in-order PDSCH operation, according to an embodiment. For in-order PDSCH, in rel-15, PDSCH reception is referred to be in-order. TS 38.213 reads "for any two HARQ process IDs in a given scheduled cell, if the UE is scheduled to start receiving a first PDSCH starting in symbol j by a physical downlink control channel (PDCCH) ending in symbol i, the UE is not expected to be scheduled to receive a PDSCH starting earlier than the end of the first PDSCH with a PDCCH that ends later than symbol i." This means that a later PDCCH must schedule a later PDSCH. For example, in the PDSCH operation 202, downlink control information (DCI) 1 204 schedules a first PDSCH 208, and the later DCI 206 schedules a later PDSCH 210. A similar configuration would apply for an in-order PUSCH operation.

In Rel-15, there are processing time capabilities for PDSCH and PUSCH. Upon reception of the PDSCH, the UE should expect that the time gap between the end of the last symbol of the PDSCH and the start of the first symbol of the HARQ-ACK physical uplink control channel (PUCCH) is greater than $N_1$ symbols. There are two capabilities for PDSCH processing. Capability 1 defines a slow PDSCH processing time for which specific values of $N_1$ are defined for different numerologies of the serving cell. Capability 2 defines a fast PDSCH processing time. Compared to capability 1, a set of smaller values of $N_1$ are defined for capability 2. Similar slow and fast capabilities are defined for PUSCH preparation time which is measured from the last symbol of the scheduling DCI to the start of the first symbol of the PUSCH. The capability 1 and capability 2 PUSCH processing time defines different values for $N_2$.

The aforementioned in-order operations in Rel-15 may put an unnecessary restriction to the gNB and have negative impacts on the latency requirement for URLLC. For example, with in-order HARQ, the HARQ-ACK of a later URLLC PDSCH cannot be transmitted before that of an earlier eMBB PDSCH. Sending the HARQ-ACK of URLLC before that of eMBB would be desired as it can reduce the end-to-end latency of the URLLC packet. Similar impacts can be observed from other in-order operations.

For a Rel. 16 eURLLC UE and dynamic downlink scheduling, on the active BWP of a given serving cell, the HARQ-ACK associated with the second PDSCH with HARQ process ID x received after the first PDSCH with HARQ process ID y (x !=y) can be sent before the HARQ-ACK of the first PDSCH. When two unicast PDSCHs for a UE are overlapping, overlapping may occur in the time domain and not in the frequency domain, and overlapping may occur in both in the time and frequency domains.

Figure 3:
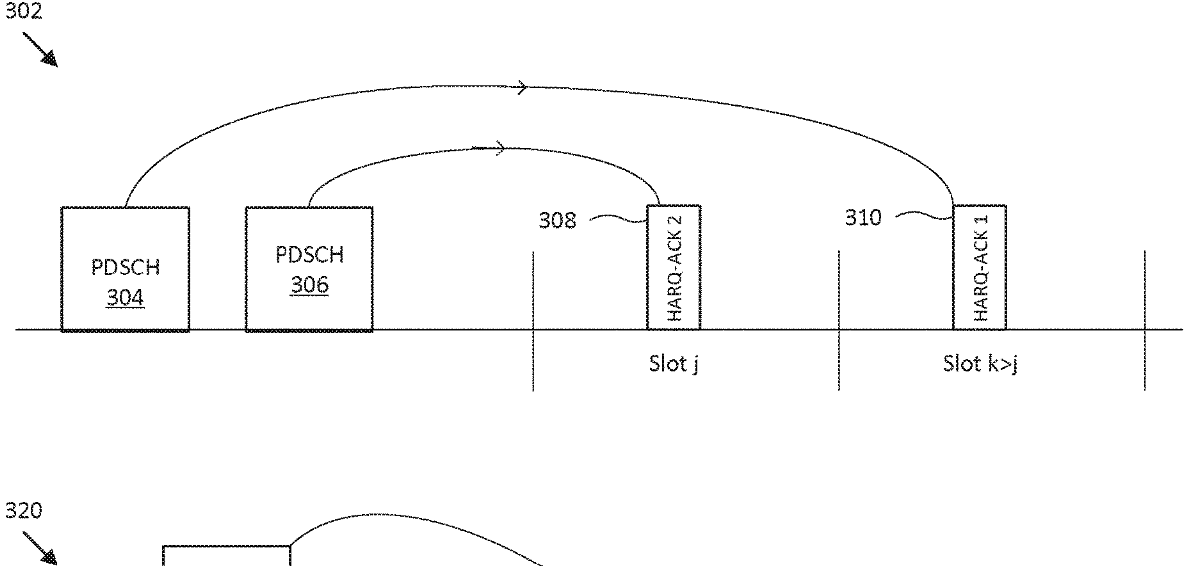
FIG. 3 illustrates a diagram of out of order HARQ-ACK operations, according to an embodiment.
Figure 3:
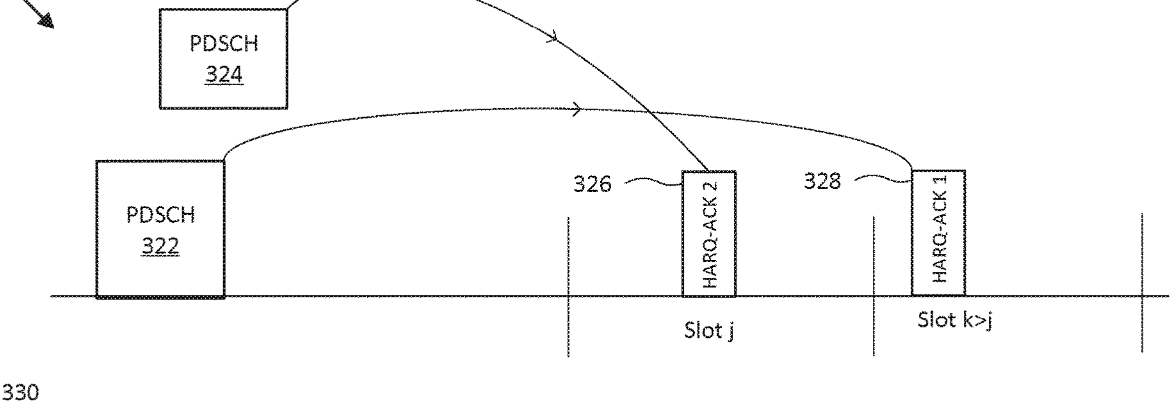
Figure 3:
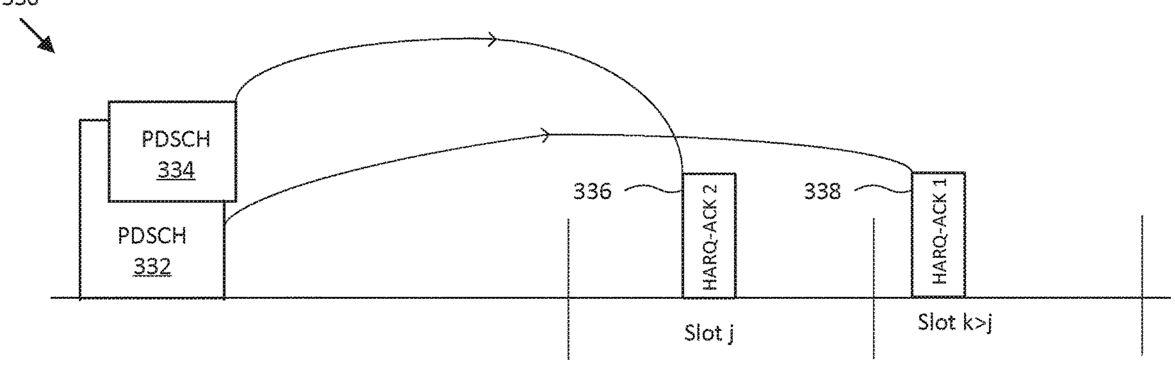

FIG. 3 illustrates a diagram of out of order HARQ-ACK operations, according to an embodiment. In operation 302, a gNB schedules an eMBB PDSCH 304 and a later URLLC PDSCH 306 and requests for HARQ-ACK 308 of the URLLC PDSCH before that of the eMBB PDSCH 310. Due to the latency requirement of the URLLC, it is expected that the network configures the serving cell with fast capability 2 processing time. In this case, an eMBB (low priority) PDSCH 302 is intentionally scheduled to provide the HARQ-ACK bits with a large time gap between the end of PDSCH and the start of HARQ-ACK PUCCH. In case of a sporadic URLLC (high priority) PDSCH, the network can then schedule it as early as possible with the requested HARQ-ACK bits to be transmitted before that of the low priority PDSCH.

It is also possible for the low and high priority PDSCHs to overlap in time or both in time and frequency. In operation 320, the first PDSCH 322 overlaps in time with the second PDSCH 324, while the HARQ-ACK 326 for the second PDSCH 324 is requested before the HARQ-ACK 328 for the first PDSCH 322. In operation 330, the first PDSCH 332 overlaps in time and in frequency with the second PDSCH 334, while the HARQ-ACK 336 for the second PDSCH 332 is requested before the HARQ-ACK 338 for the first PDSCH 332. In any of these cases, the UE capabilities are defined to process these channels. A UE can report a capability to process only the second PDSCH or both PDSCHs in operations 320 and 330. In operation 330, the UE is expected to have the REs corresponding to the PDSCH 332 to be preempted by the gNB for the high priority PDSCH. In any case, regardless of the declared UE capability to process the PDSCHs, the UE reports the HARQ-ACK bits for both channels.

Figure 4:
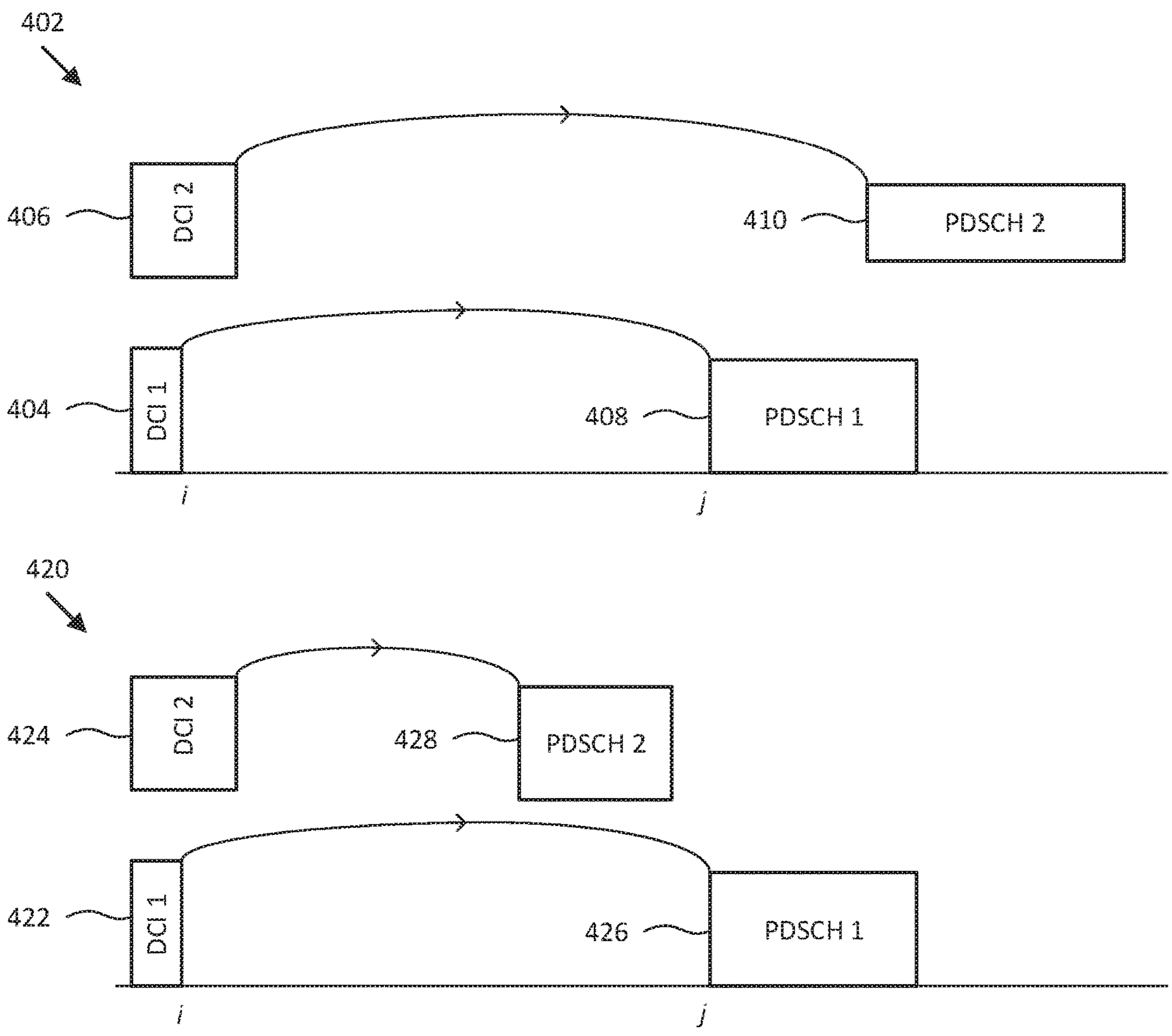
FIG. 4 illustrates a diagram of an out of order PDSCH operation, according to an embodiment.

FIG. 4 illustrates a diagram of an out of order PDSCH operation, according to an embodiment. In operation 402, the first DCI 404 schedules the first PDSCH 408 and the second DCI 406 schedules the second PDSCH 410, but the second PDSCH 410 overlaps in time with the first PDSCH 408. In operation 420, the first DCI 422 schedules the first PDSCH 426 and the second DCI 424 schedules the second PDSCH 428, but the second PDSCH 428 is scheduled before the first PDSCH 426. Similar operations may occur with PUSCH. In out of order PUSCHs, on the active bandwidth part (BWP) of a given serving cell, the UE can be scheduled with a second PUSCH associated with HARQ process x starting earlier than the ending symbol of the first PUSCH associated with HARQ process y (x !=y) with a PDCCH that does not end earlier than the ending symbol of first scheduling PDCCH.

The disclosed systems and methods allow a UE to process two overlapping PDSCHs where the overlapping can be in time or frequency domain and the two PDSCHs are of two different priorities. The systems and methods determine the processing time of the high priority PDSCH in case the UE drops processing of the first PDSCH. The systems and methods increase the processing time of the second PDSCH by d OFDM symbols.

The systems and methods allow the UE to indicate to the network the amount of extra time it needs for dropping a low priority PDSCH and start processing of the high priority PDSCH. The indication is via a UE capability signaling. The increase value may be fixed. The amount of increase in processing time of the second PDSCH may be proportional to the amount of time the UE requires for processing a code block (CB).

Without an increase in the processing time of the second (high priority) PDSCH, a less advanced UE may not be even meet the timeline for processing the second PDSCH. Since the second PDSCH is typically a high priority URLLC traffic, failing to process it is not desired. The systems and methods also include a capability signaling where UE declares the minimum value of increase it requires to process the second PDSCH. Therefore, the network can increase the processing time of the second PDSCH by the right amount without sacrificing the latency requirement for URLLC.

Out-of-order behavior for a HARQ-ACK of PDSCH is described above. Such a behavior does not exist in Rel-15 where the behavior is in-order.

Figure 5:
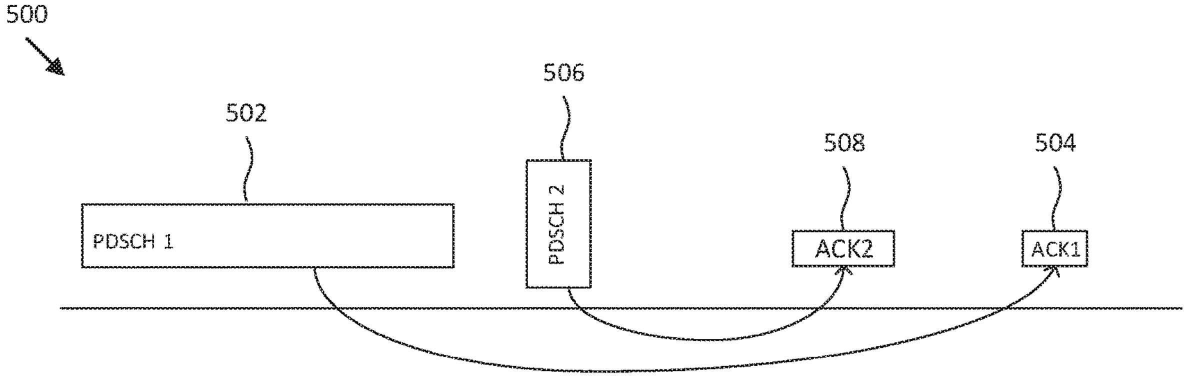
FIG. 5 illustrates a diagram of an out of order HARQ procedure, according to an embodiment.
Figure 5:
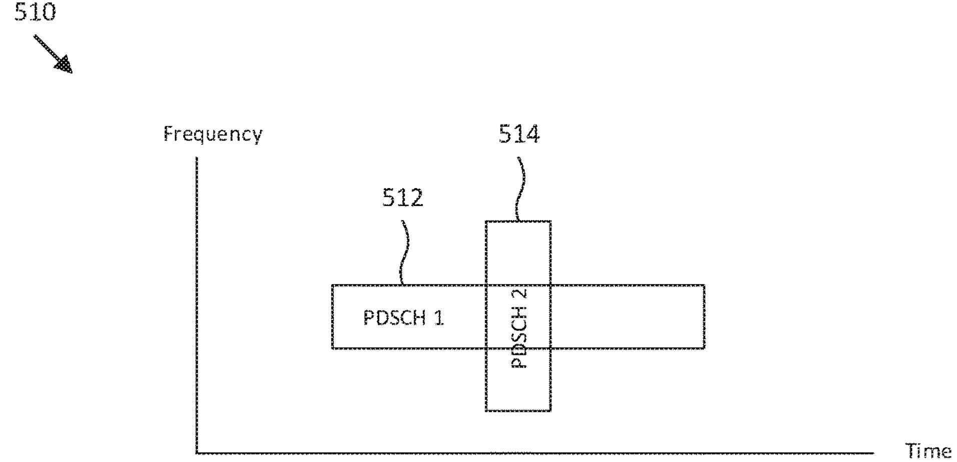

FIG. 5 illustrates a diagram of an out of order HARQ procedure, according to an embodiment. The operation 500 includes a first PDSCH 502 with a corresponding HARQ-ACK 504 and a second PDSCH 506 with a corresponding HARQ-ACK 508. The first PDSCH 502 is supposed to have a low priority and the second PDSCH 506 is supposed to have a high priority. The out of order ACK can be used to support the requirement for URLLC as an important use case for the new radio (NR) technology. In a typical scenario, the network can schedule an eMBB PDSCH 502. Then a second high-priority (e.g., URLLC) PDSCH 506 is scheduled after scheduling of the first PDSCH. Since the second PDSCH 506 is more urgent its ACK 508 should be sent before that of the first PDSCH 502 as shown in FIG. 5. In addition, as shown in operation 510, the two PDSCHs 512 and 514 themselves might overlap in time or/and frequency.

In a normal scenario where a PDSCH does not overlap with any other PDSCH, its ACK is expected to be transmitted by the UE no earlier than $N_1$ symbols from the end of the last symbol of the PDSCH, where $N_1$ is the PDSCH processing time capability according to TS38.214. However, when the two PDSCHs overlap, their processing time capability $N_1$ should be further relaxed. In an embodiment, the UE is expected to always process the second PDSCH. Whether or not to process the first PDSCH depends on a variety of factors including UE capability, number of baseband processors (pipelines), etc. These factors in general indicate how "advanced" the UE is. One UE behavior is that the UE always processes both PDSCHs as a UE capability. A different UE behavior is that the UE always drops processing of the first PDSCH or drops the processing of the first PDSCH under some scheduling condition.

When the UE drops the processing of the first PDSCH, UE may need additional time for processing of the second PDSCH. This is mainly because it might have processed the first PDSCH to some extent. Had it known the existence of the second PDSCH early enough it could have fully allocated its processing units to the second one. Therefore, it is useful to provide the UE with some additional time to process the second PDSCH. This can be done by increasing the UE processing time of the second PDSCH by d OFDM symbols. Such an increase may not be needed for a UE which processes both PDSCHs as such a UE is considered to be "advanced" and does not need extra processing time. The systems and methods determine the amount of delay d to apply for the processing time of the second PDSCH. With a relaxation amount d, the first uplink symbol of the PUCCH which carries HARQ-ACK information of the second PDSCH starts no earlier the symbol which comes $N_1+d$ symbols after the last symbol of the corresponding PDSCH.

When overlapping in time domain occurs between two unicast PDSCHs for a UE (i.e., first PDSCH with low priority and second PDSCH with high priority), the processing time of the second (high priority) PDSCH is increased by d symbol. That is, if the processing time of the second PDSCH without the first PDSCH is $N_1$ OFDM symbols, with presence of the first PDSCH, the processing time of the second PDSCH is increased to $N_1+d$ OFDM symbols.

Figure 6:
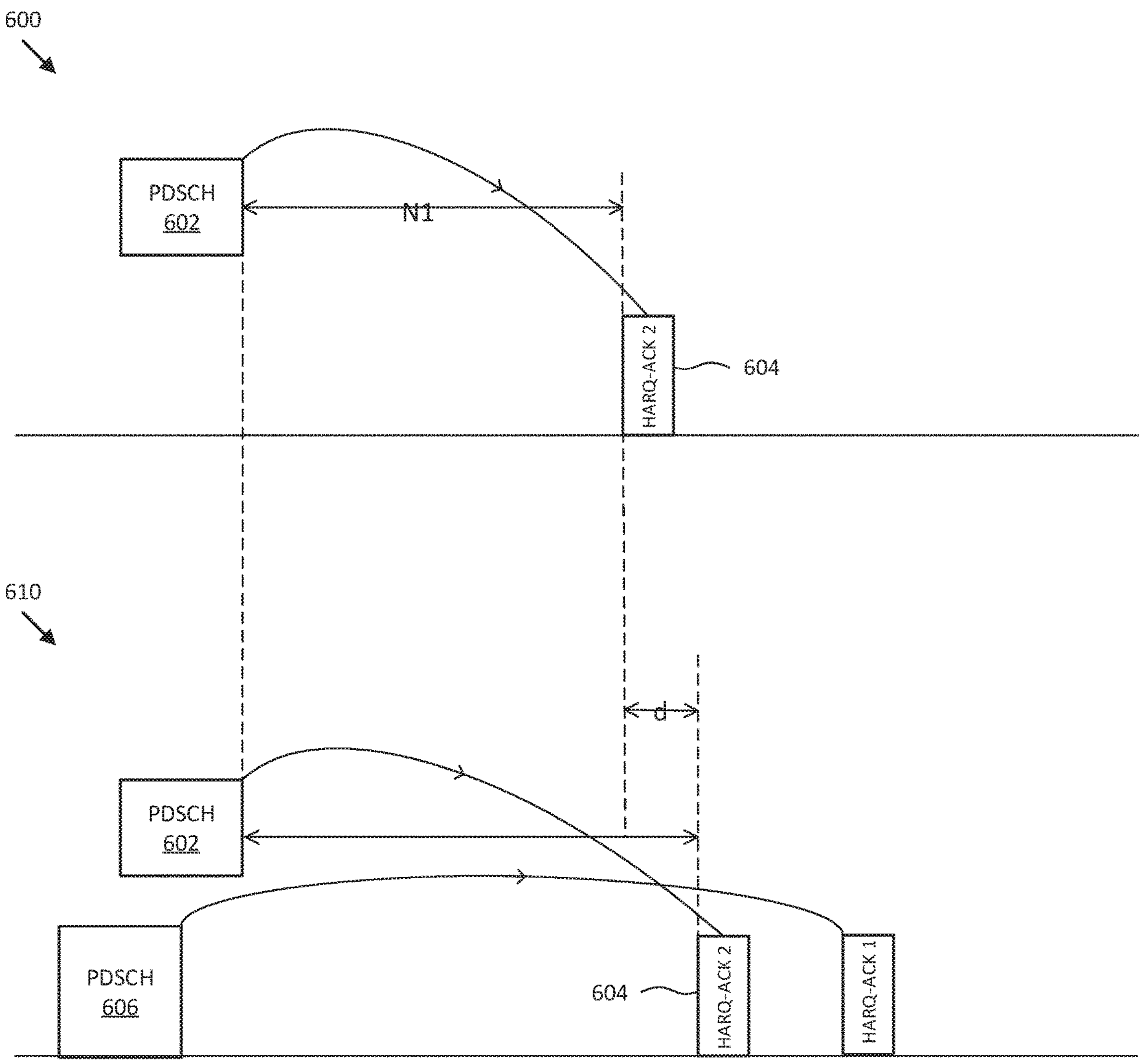
FIG. 6 illustrates an operation including a delay, according to an embodiment.

FIG. 6 illustrates an operation including a delay, according to an embodiment. In operation 600, the high priority PDSCH 602 includes a corresponding HARQ-ACK 604 separated by a processing time capability $N_1$. There is no overlapping, so the HARQ-ACK 604 can be processed without delay. In operation 610, the high priority PDSCH 602 overlaps in time with the PDSCH 606. Thus, the processing time of the HARQ-ACK 604 is delayed by d, which, in the operation 610, is the time amount that is overlapped between PDSCH 602 and PDSCH 606.

Below are different methods to determine the value of the relaxation amount/delay d. These methods include values which are fixed between the UE and gNB, values which are determined based on UE capability and radio resource control (RRC) configurations as well as an analysis on the time required by the UE for processing the code blocks of the first PDSCH.

In one example, the value of d is fixed. The value of d for the UE is fixed by the network as a function of subcarrier spacing (SCS) or the numerology μ and the original processing time capability $N_1$. As an example, value of d may be any number from {1,2,3,4}. Fixing the value of d provides simplicity as it requires little specification efforts. In case that no capability or RRC signaling is desired, this method can be adopted to serve all the UEs.

In one example, the value of d is determined based on UE capability and RRC configuration. The value of d may be chosen according to the UE capability. The UE reports a capability value $d_{min} \in \{0, 1, \ldots, d_{max}\}$, where $d_{min}$ indicates a minimum value of d supported by the UE and the gNB ensures that the processing time of the second PDSCH is increased to $N_1+d$, where $d \geq d_{min}$. The quantity $d_{max}$ determines the maximum of processing time relaxation amount allowed by the network and is fixed for all UEs. Network configures the UE via RRC signaling a value of d from the values in the set $\{0, 1, \ldots, d_{max}\}$. As an alternative, the network may configure the UE via RRC with a value of $d_{max}$ in a UE specific manner. The UE may still report $d_{min}$ and network may configure UE via RRC with a value of d from the values in the set $\{0, 1, \ldots, d_{max}\}$.

This allows the more "capable" UEs to process the second PDSCH with a delay according to their capabilities. A UE reporting a smaller value of $d_{min}$ indicates to the gNB that it requires less amount of relaxation time for processing the second PDSCH than a UE reporting a larger value of $d_{min}$. A UE reporting $d_{min}=0$ indicates to the gNB that it does not need any extra time for processing of the second PDSCH.

In one example, the value of d is determined based on UE's code-block processing time. The value of d for the second PDSCH should be determined based on codeblock (CB) processing time of the first PDSCH. Any of the following two approaches can be taken.

First, when dropping the first PDSCH, the processing time capability of the second PDSCH is increased by $$d = \left\lceil \frac{T_{max}}{T_{symb}} \right\rceil$$

OFDM symbols, where $T_{symb}$ is the duration of the OFDM symbol and $T_{max}$ is the maximum of the CB processing time over all the CBs of first PDSCH.

$$T_{max} = \max_{i=1,\ldots,M} T_i,$$

where $T_i$ is the amount of time required for UE to process the i-th CB in the first PDSCH. The network may configure the UE with different values of time (i.e., OFDM symbols) for processing a specific CB according to the length of the CB in the time domain, or the number of RBs in frequency domain, or both.

Second, when dropping the first PDSCH, the processing time capability of the second PDSCH is increased by $$d = d_{CB}^{symb,max},$$

where $$d_{CB}^{symb,max}$$

is the maximum overall CBs of the first PDSCH of the number of OFDM symbols which carry a CB of the first PDSCH.

From the UE implementation perspective, if the second PDSCH is scheduled early enough, the UE may not have even started the processing of the first PDSCH. So it can easily drop the first PDSCH and start processing of the second PDSCH right away. However, due to the urgent and sporadic nature of URLLC, it could be the case that the UE has already started the processing of the first PDSCH. Considering different processing blocks including fast Fourier transform (FFT), channel estimation (CE), symbol detector (SD) and decoder (DEC), a CB level processing pipeline can be implemented. Therefore, it is natural to assume that UE can stop the PDSCH processing at the CB level boundary.

Figure 7:
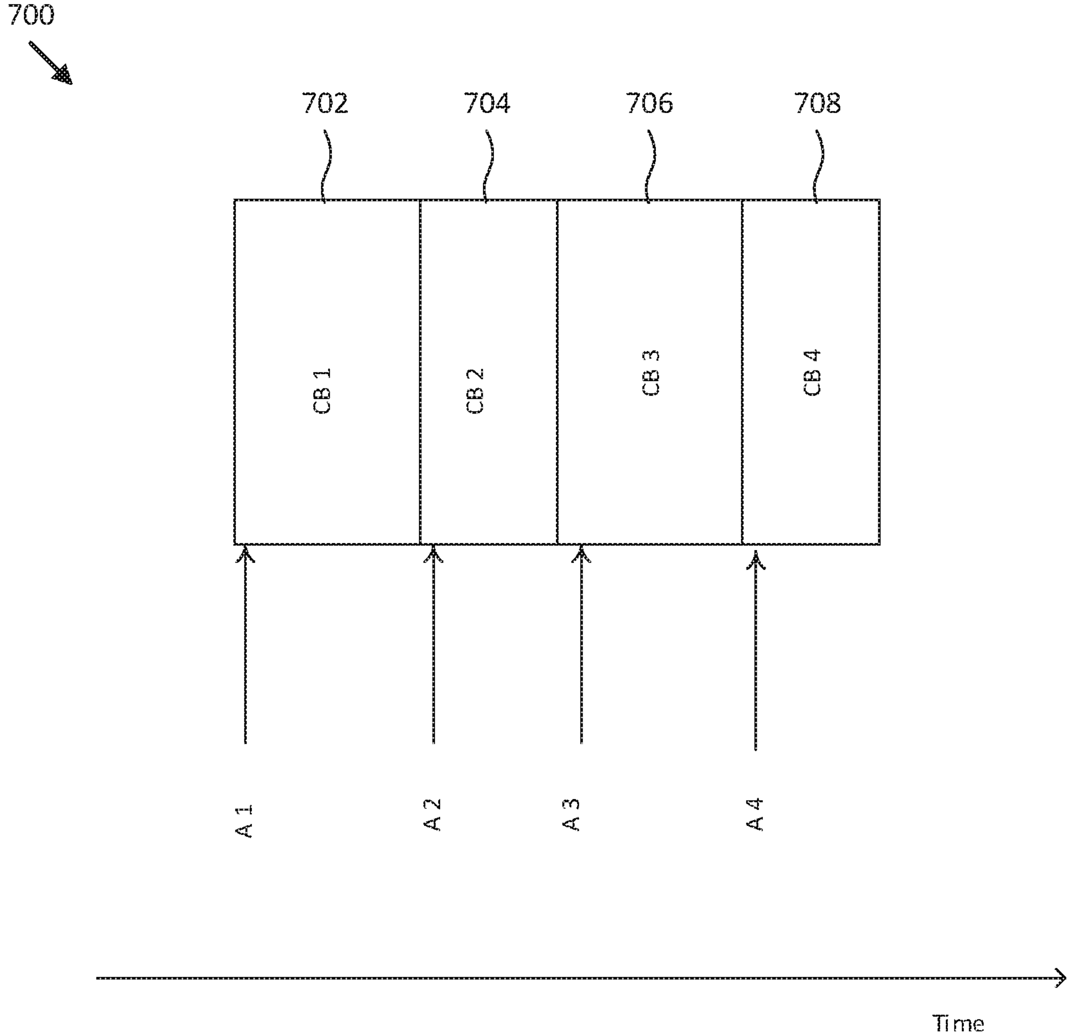
FIG. 7 illustrates a diagram of a PDSCH at a code block (CB) level, according to an embodiment.

FIG. 7 illustrates a diagram of a PDSCH at a CB level, according to an embodiment. The PDSCH 700 includes CB1 702, CB2 704, CB3 706 and CB4 708. Assuming that processing of a CB takes T seconds, the UE should be provided with extra time in the amount of T to finish off the processing/dropping of a current CB and start the processing of the second PDSCH. This additional time T is in fact a wasted time which the UE could have used to start the process of the second PDSCH and therefore should be accounted for when determining the value of d. For a PDSCH containing M CBs (e.g., four CBs in PDSCH 700), assume the processing of CB number i takes $T_i$ seconds. Assuming that the UE is currently processing CB number i when it decides to stop the processing, it should be provided with extra time in the amount of $T_i$ for the second PDSCH processing. As shown in FIG. 6, if the UE decides to stop processing of the first PDSCH at point $A_1$, a value of $T_1$ should be added to processing time for the second PDSCH and so on. Since the gNB does not know at which point the UE decides to stop the processing, it is reasonable to provide the UE with the maximum value $$T_{max} = \max_{i=1,\ldots,M} T_i$$

extra time.

Figure 8:
FIG. 8 illustrates a flowchart for a method of processing channels, according to an embodiment.
Figure 8:
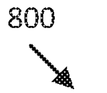
Figure 8:
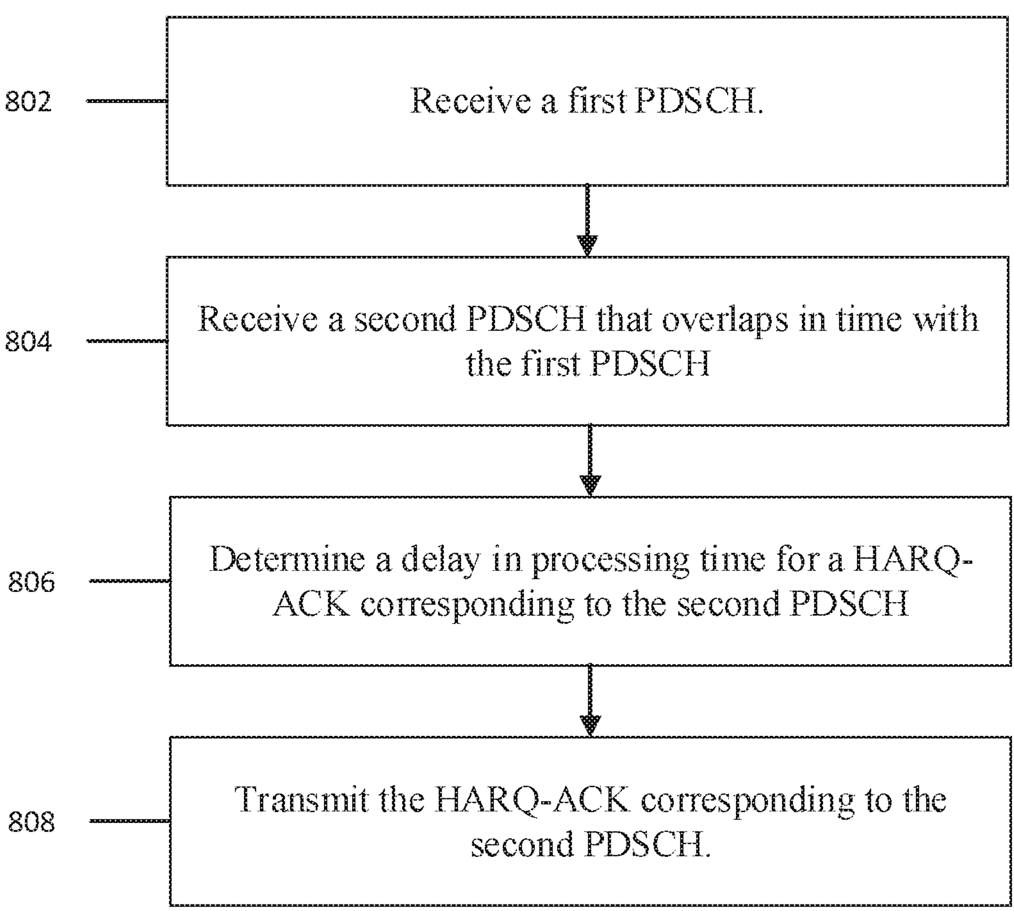

FIG. 8 illustrates a flowchart for a method of processing channels. At 802, a UE receives a first PDSCH. At 804, the UE receives a second PDSCH that overlaps in time with the first PDSCH. At 806, the UE determines a delay in processing time for a HARQ-ACK corresponding to the second PDSCH. The delay in processing time may be determined based on a UE capability, a fixed value of delay between the UE and the terminal, or a code block (CB) UE processing time. At 808, the UE transmits the HARQ-ACK corresponding to the second PDSCH to the terminal.

Figure 9:
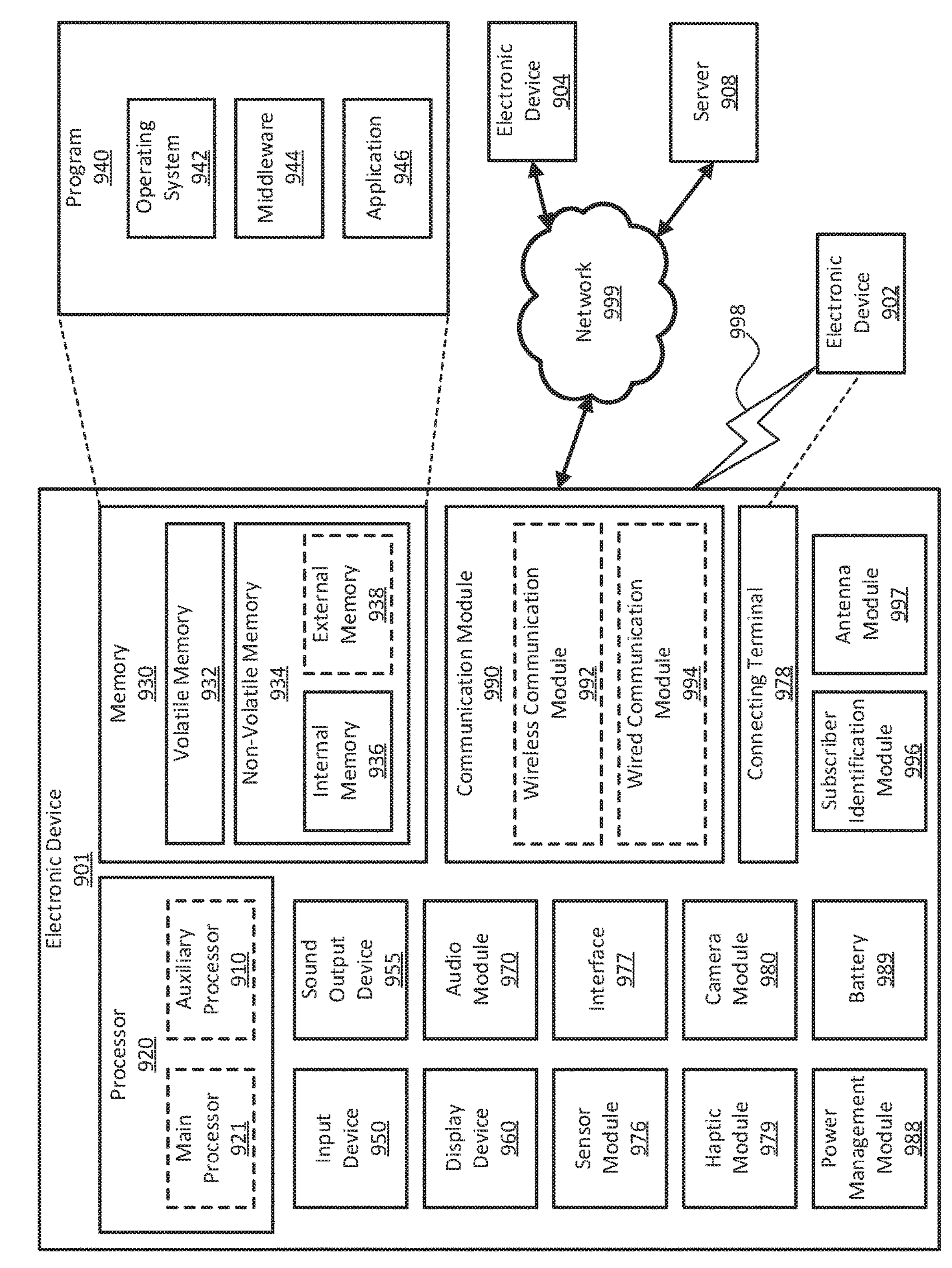
FIG. 9 illustrates a block diagram of an electronic device in a network environment, according to one embodiment.

FIG. 9 illustrates a block diagram of an electronic device 901 in a network environment 900, according to one embodiment. Referring to FIG. 9, the electronic device 901 in the network environment 900 may communicate with an electronic device 902 via a first network 998 (e.g., a short-range wireless communication network), or an electronic device 904 or a server 908 via a second network 999 (e.g., a long-range wireless communication network). The electronic device 901 may communicate with the electronic device 904 via the server 908. The electronic device 901 may include a processor 920, a memory 930, an input device 950, a sound output device 955, a display device 960, an audio module 970, a sensor module 976, an interface 977, a haptic module 979, a camera module 980, a power management module 988, a battery 989, a communication module 990, a subscriber identification module (SIM) 996, or an antenna module 997. In one embodiment, at least one (e.g., the display device 960 or the camera module 980) of the components may be omitted from the electronic device 901, or one or more other components may be added to the electronic device 901. In one embodiment, some of the components may be implemented as a single integrated circuit (IC). For example, the sensor module 976 (e.g., a fingerprint sensor, an iris sensor, or an illuminance sensor) may be embedded in the display device 960 (e.g., a display).

The processor 920 may execute, for example, software (e.g., a program 940) to control at least one other component (e.g., a hardware or a software component) of the electronic device 901 coupled with the processor 920, and may perform various data processing or computations. As at least part of the data processing or computations, the processor 920 may load a command or data received from another component (e.g., the sensor module 976 or the communication module 990) in volatile memory 932, process the command or the data stored in the volatile memory 932, and store resulting data in non-volatile memory 934. The processor 920 may include a main processor 921 (e.g., a central processing unit (CPU) or an application processor (AP)), and an auxiliary processor 923 (e.g., a graphics processing unit (GPU), an image signal processor (ISP), a sensor hub processor, or a communication processor (CP)) that is operable independently from, or in conjunction with, the main processor 921. Additionally or alternatively, the auxiliary processor 923 may be adapted to consume less power than the main processor 921, or execute a particular function. The auxiliary processor 923 may be implemented as being separate from, or a part of, the main processor 921.

The auxiliary processor 923 may control at least some of the functions or states related to at least one component (e.g., the display device 960, the sensor module 976, or the communication module 990) among the components of the electronic device 901, instead of the main processor 921 while the main processor 921 is in an inactive (e.g., sleep) state, or together with the main processor 921 while the main processor 921 is in an active state (e.g., executing an application). According to one embodiment, the auxiliary processor 923 (e.g., an image signal processor or a communication processor) may be implemented as part of another component (e.g., the camera module 980 or the communication module 990) functionally related to the auxiliary processor 923.

The memory 930 may store various data used by at least one component (e.g., the processor 920 or the sensor module 976) of the electronic device 901. The various data may include, for example, software (e.g., the program 940) and input data or output data for a command related thereto. The memory 930 may include the volatile memory 932 or the non-volatile memory 934.

The program 940 may be stored in the memory 930 as software, and may include, for example, an operating system (OS) 942, middleware 944, or an application 946.

The input device 950 may receive a command or data to be used by other component (e.g., the processor 920) of the electronic device 901, from the outside (e.g., a user) of the electronic device 901. The input device 950 may include, for example, a microphone, a mouse, or a keyboard.

The sound output device 955 may output sound signals to the outside of the electronic device 901. The sound output device 955 may include, for example, a speaker or a receiver. The speaker may be used for general purposes, such as playing multimedia or recording, and the receiver may be used for receiving an incoming call. According to one embodiment, the receiver may be implemented as being separate from, or a part of, the speaker.

The display device 960 may visually provide information to the outside (e.g., a user) of the electronic device 901. The display device 960 may include, for example, a display, a hologram device, or a projector and control circuitry to control a corresponding one of the display, hologram device, and projector. According to one embodiment, the display device 960 may include touch circuitry adapted to detect a touch, or sensor circuitry (e.g., a pressure sensor) adapted to measure the intensity of force incurred by the touch.

The audio module 970 may convert a sound into an electrical signal and vice versa. According to one embodiment, the audio module 970 may obtain the sound via the input device 950, or output the sound via the sound output device 955 or a headphone of an external electronic device 902 directly (e.g., wired) or wirelessly coupled with the electronic device 901.

The sensor module 976 may detect an operational state (e.g., power or temperature) of the electronic device 901 or an environmental state (e.g., a state of a user) external to the electronic device 901, and then generate an electrical signal or data value corresponding to the detected state. The sensor module 976 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 977 may support one or more specified protocols to be used for the electronic device 901 to be coupled with the external electronic device 902 directly (e.g., wired) or wirelessly. According to one embodiment, the interface 977 may include, for example, a high definition multimedia interface (HDMI), a universal serial bus (USB) interface, a secure digital (SD) card interface, or an audio interface.

A connecting terminal 978 may include a connector via which the electronic device 901 may be physically connected with the external electronic device 902. According to one embodiment, the connecting terminal 978 may include, for example, an HDMI connector, a USB connector, an SD card connector, or an audio connector (e.g., a headphone connector).

The haptic module 979 may convert an electrical signal into a mechanical stimulus (e.g., a vibration or a movement) or an electrical stimulus which may be recognized by a user via tactile sensation or kinesthetic sensation. According to one embodiment, the haptic module 979 may include, for example, a motor, a piezoelectric element, or an electrical stimulator.

The camera module 980 may capture a still image or moving images. According to one embodiment, the camera module 980 may include one or more lenses, image sensors, image signal processors, or flashes.

The power management module 988 may manage power supplied to the electronic device 901. The power management module 988 may be implemented as at least part of, for example, a power management integrated circuit (PMIC).

The battery 989 may supply power to at least one component of the electronic device 901. According to one embodiment, the battery 989 may include, for example, a primary cell which is not rechargeable, a secondary cell which is rechargeable, or a fuel cell.

The communication module 990 may support establishing a direct (e.g., wired) communication channel or a wireless communication channel between the electronic device 901 and the external electronic device (e.g., the electronic device 902, the electronic device 904, or the server 908) and performing communication via the established communication channel. The communication module 990 may include one or more communication processors that are operable independently from the processor 920 (e.g., the AP) and supports a direct (e.g., wired) communication or a wireless communication. According to one embodiment, the communication module 990 may include a wireless communication module 992 (e.g., a cellular communication module, a short-range wireless communication module, or a global navigation satellite system (GNSS) communication module) or a wired communication module 994 (e.g., a local area network (LAN) communication module or a power line communication (PLC) module). A corresponding one of these communication modules may communicate with the external electronic device via the first network 998 (e.g., a short-range communication network, such as Bluetooth™, wireless-fidelity (Wi-Fi) direct, or a standard of the Infrared Data Association (IrDA)) or the second network 999 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 992 may identify and authenticate the electronic device 901 in a communication network, such as the first network 998 or the second network 999, using subscriber information (e.g., international mobile subscriber identity (IMSI)) stored in the subscriber identification module 996.

The antenna module 997 may transmit or receive a signal or power to or from the outside (e.g., the external electronic device) of the electronic device 901. According to one embodiment, the antenna module 997 may include one or more antennas, and, therefrom, at least one antenna appropriate for a communication scheme used in the communication network, such as the first network 998 or the second network 999, may be selected, for example, by the communication module 990 (e.g., the wireless communication module 992). The signal or the power may then be transmitted or received between the communication module 990 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 901 and the external electronic device 904 via the server 908 coupled with the second network 999. Each of the electronic devices 902 and 904 may be a device of a same type as, or a different type, from the electronic device 901. All or some of operations to be executed at the electronic device 901 may be executed at one or more of the external electronic devices 902, 904, or 908. For example, if the electronic device 901 should perform a function or a service automatically, or in response to a request from a user or another device, the electronic device 901, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 901. The electronic device 901 may provide the outcome, with or without further processing of the outcome, as at least part of a reply to the request. To that end, a cloud computing, distributed computing, or client-server computing technology may be used, for example.

One embodiment may be implemented as software (e.g., the program 940) including one or more instructions that are stored in a storage medium (e.g., internal memory 936 or external memory 938) that is readable by a machine (e.g., the electronic device 901). For example, a processor of the electronic device 901 may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. A method, comprising:

receiving a first physical downlink shared channel (PDSCH);

receiving a second PDSCH that overlaps in time with the first PDSCH;

determining a delay in processing time for a hybrid automatic repeat request (HARQ)-acknowledgement (ACK) corresponding to the second PDSCH based on the overlapping time between the first PDSCH and the second PDSCH;

determining a symbol to initiate transmitting the HARQ-ACK corresponding to the second PDSCH based on the determined delay in processing time; and transmitting, starting at the determined symbol, the HARQ-ACK corresponding to the second PDSCH.

2. The method of claim 1, wherein the delay in processing time is determined based on a fixed value of delay between a user equipment (UE) and a terminal.

3. The method of claim 1, wherein the delay in processing time is determined based on a user equipment (UE) capability.

4. The method of claim 3, wherein the delay in processing time is determined to be between a UE capability value indicating a minimum delay supported by the UE and a maximum processing time relaxation amount allowed by a network.

5. The method of claim 1, wherein the delay in processing time is determined based on a code block (CB) user equipment (UE) processing time.

6. The method of claim 5, wherein the delay in processing time is further determined based on a CB processing time of the first PDSCH.

7. The method of claim 6, wherein the delay in processing time is further determined based on a maximum overall CB of the first PDSCH.

8. A user equipment (UE), comprising:

a transceiver; and a processor configured to:

receive, from a terminal, a first physical downlink shared channel (PDSCH);

receive, from the terminal, a second PDSCH that overlaps in time with the first PDSCH;

determine a delay in processing time for a hybrid automatic repeat request (HARQ)-acknowledgement (ACK) corresponding to the second PDSCH based on the overlapping time between the first PDSCH and the second PDSCH;

determine a symbol to initiate transmitting the HARQ-ACK corresponding to the second PDSCH based on the determined delay in processing time; and transmit, to the terminal, starting at the determined symbol, the HARQ-ACK corresponding to the second PDSCH.

9. The UE of claim 8, wherein the processor is further configured to determine the delay in processing time based on a fixed value of delay between the UE and the terminal.

10. The UE of claim 8, wherein the processor is further configured to determine the delay in processing time based on a UE capability.

11. The UE of claim 10, wherein the processor is further configured to determine the delay in processing time to be between a UE capability value indicating a minimum delay supported by the UE and a maximum processing time relaxation amount allowed by a network.

12. The UE of claim 8, wherein the processor is further configured to determine the delay in processing time based on a code block (CB) UE processing time.

13. The UE of claim 12, wherein the processor is further configured to determine the delay in processing time based on a CB processing time of the first PDSCH.

14. The UE of claim 13, wherein the processor is further configured to determine the delay in processing time based on a maximum overall CB of the first PDSCH.

15. A terminal, comprising:

a transceiver; and a controller configured to:

transmit, to a user equipment (UE), a first physical downlink shared channel (PDSCH);

transmit, to the UE, a second PDSCH that overlaps in time with the first PDSCH;

receive, from the UE, a hybrid automatic repeat request (HARQ)-acknowledgement (ACK) corresponding to the second PDSCH, wherein the HARQ-ACK corresponding to the second PDSCH is received starting in a symbol determined in according with a delay in processing time that is delayed determined by the UE based on the overlapping time between the first PDSCH and the second PDSCH.

16. The terminal of claim 15, wherein the HARQ-ACK is delayed by the UE based on a fixed value of delay between the UE and the terminal.

17. The terminal of claim 15, wherein the HARQ-ACK is delayed by the UE based on a UE capability.

18. The terminal of claim 17, wherein the delay of the HARQ-ACK is determined by the UE to be between a UE capability value indicating a minimum delay supported by the UE and a maximum processing time relaxation amount allowed by a network.

19. The terminal of claim 15, wherein the HARQ-ACK is delayed by the UE based on a code block (CB) UE processing time.

20. The terminal of claim 19, wherein HARQ-ACK is delayed by the UE based on a CB processing time of the first PDSCH.

* * * * *